United States Patent [19]

Canivenc et al.

[11] Patent Number: 5,102,707
[45] Date of Patent: Apr. 7, 1992

[54] DIORGANOPOLYSILOXANES CONTAINING BENZOTRIAZOLE FUNCTIONAL GROUPS

[75] Inventors: Edith Canivenc, Lyons; Serge Forestier, Clay-Souilly; Michel Gay, Lyons; Gerard Lang, Saint-Gratien; Herve Richard, Paris, all of France

[73] Assignee: Rhone-Poulenc Chimie, Cedex, France

[21] Appl. No.: 389,868

[22] Filed: Aug. 4, 1989

[30] Foreign Application Priority Data

Aug. 4, 1988 [FR] France ............................ 88 10777

[51] Int. Cl.⁵ .............................................. B32B 3/10
[52] U.S. Cl. .................................... 428/44; 548/256; 548/110; 525/104; 528/15; 528/27; 524/262
[58] Field of Search .................. 548/256, 110; 428/44; 525/104; 528/15, 27; 524/262

[56] References Cited

U.S. PATENT DOCUMENTS

| | | | |
|---|---|---|---|
| 4,210,578 | 1/1980 | Rody et al. | 528/28 |
| 4,316,033 | 2/1982 | Ching | 548/110 |
| 4,349,602 | 9/1982 | Ching | 548/110 |
| 4,859,759 | 8/1989 | Maycock et al. | 548/110 |
| 4,868,251 | 9/1989 | Reich et al. | 525/479 |
| 4,960,898 | 10/1990 | Sakuta et al. | 548/110 |

FOREIGN PATENT DOCUMENTS 2077280 12/1981 United Kingdom.

OTHER PUBLICATIONS

Australian Patent Abstract 32719/89.
Angewandte Chemie—vol. 99, No. 11, 1987, pp. 1204–1206, Weinheim, D; I. Cabrera et al.: "Photound thermochrome flussigkristalline Polysiloxane" p. 1205, formules*.
Die Markromolekulare Chemie, vol. 7, No. 12, Dec. 1986, pp. 771–775, Basel, CH; P. Strohriegl: "Snythesis and characterization of some novel polysiloxanes," *p. 773, formule 3, p. 774, formula 3 B*.
Makromolekulare Chemie—vol. 7, No. 2, Feb. 1986, pp. 71–76, Basel, CH; G. W. Gray et al.: "Preparation of liquid crystalline polysiloxanes with terminal cyano groups in the side chains," *p. 71, formules*.

Primary Examiner—Melvyn I. Marquis
Assistant Examiner—M. Glass
Attorney, Agent, or Firm—Burns, Doane, Swecker & Mathis

[57] ABSTRACT

Linear and cyclic diorganopolysiloxanes containing benzotriazole functional groups are well suited for the coating of optical fibers and for lubricating plastics, e.g., PVC.

11 Claims, No Drawings

DIORGANOPOLYSILOXANES CONTAINING BENZOTRIAZOLE FUNCTIONAL GROUPS

BACKGROUND OF THE INVENTION

1. Field of the Invention

The present invention relates to novel diorganopolysiloxanes comprising a benzotriazole functional group.

2. Description of the Prior Art

It is known to this art to modify diorganopolysiloxanes, whether along the polymer chain and/or at the end of the polymer chain, with various organic functional groups, with a view towards imparting specific properties to such silicone polymers.

A convenient technique for introducing these organic functional groups is to carry out a hydrosilylation reaction between a diorganopolysiloxane bearing at least one SiH group and an ethylenically unsaturated organic compound in the presence of a catalytically effective amount of a platinum catalyst.

Exemplary of such prior art are:

(i) U.S. Pat. Nos. 2,970,150 and 4,160,775, describing the addition of allyl or methallyl alcohol to a silane or diorganopolysiloxane bearing at least one SiH group;

(ii) U.S. Pat. Nos. 3,767,690 and 4,503,208, describing diorganopolysiloxanes bearing moieties containing an acrylate or methacrylate functional group;

(iii) U.S. Pat. No. 4,640,967, describing diorganopolysiloxanes bearing an epoxy and/or acrylate or methacrylate group and compositions comprised thereof for coating optical fibers; and (iv) Patent EP-A-0,088,842, describing diorganopolysiloxanes bearing benzophenone groups.

Also, U.S. Pat. Nos. 4,316,033 and 4,373,060 describe alkoxysilanes bearing a benzotriazole functional group F. But these patents relate to the cohydrolysis of these functional silanes with colloidal silica and an alkyltrialkoxysilane to produce a silicone resin, namely, a polymer essentially consisting of the recurring units $Q(SiO_2)$, $T(CH_3SiO_{1.5})$ and less than 2 mol % of $FSiO_{1.5}$ units. This silicone resin, when cured, is used as a coating for surfaces made of plastic.

Nonetheless, these patents do not suggest the preparation of linear or cyclic diorganopolysiloxanes comprising a benzotriazole functional group.

SUMMARY OF THE INVENTION

A major object of the present invention is the provision of novel diorganopolysiloxanes comprising particular organic functional groups, which novel diorganopolysiloxanes not only have a high refractive index permitting their incorporation into coating compositions for optical fibers, but also are suitable as a lubricant for plastic substrates, in particular for PVC.

Briefly, the present invention features modified diorganopolysiloxane polymers having the formula:

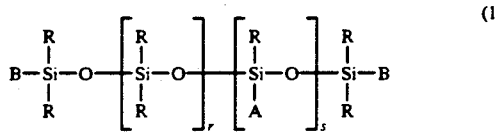

in which the symbols R, which may be identical or different, are each a $C_1$-$C_{10}$ alkyl, phenyl or 3,3,3-trifluoropropyl radical, at least 80% of the number of the R radicals being methyl radicals; the symbols B, which may be identical or different, are each a radical R or a radical A; r is an integer ranging from 0 to 200, inclusive; s is an integer ranging from 0 to 50, inclusive, with the proviso that, if is is 0, at least one of the two symbols B is A; or having the formula:

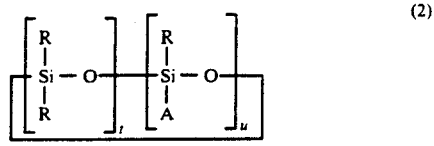

in which R is defined as in formula (1); u is an integer ranging from 1 to 20, inclusive; t is an integer ranging from 0 to 20, inclusive; and t+u is equal to or greater than 3; and further wherein said formulae (1) and (2) the symbol A is a radical of the formula:

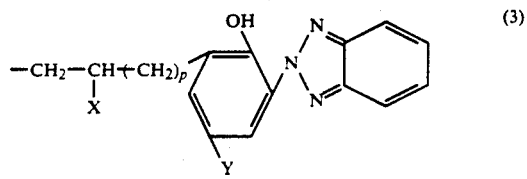

in which X is a hydrogen atom or a $C_1$-$C_4$ alkyl radical; p is an integer ranging from 1 to 10, inclusive; and Y is a hydrogen atom or a linear or branched chain $C_1$-$C_8$ alkyl radical.

DETAILED DESCRIPTION OF THE PREFERRED EMBODIMENTS OF THE INVENTION

More particularly according to the present invention, the preferred alkyl radicals R in the formulae (1) and (2) are methyl, ethyl, propyl, n-butyl, n-octyl and 2-ethylhexyl radicals. At least 80% of the number of R radicals are preferably methyl radicals.

Especially preferred are the random or block polymers of formulae (1) and (2) satisfying at least one of the following parameters:

R is methyl;
B is methyl;
Y is methyl;
p=1;
X is a hydrogen atom or methyl;
r ranges from 5 to 20, inclusive;
s ranges from 2 to 15, inclusive; and/or
t+u ranges from 3 to 10, inclusive.

To prepare the polymers of formulae (1) and (2), it is possible, for example, to use a starting material comprising the corresponding polymer in which all of the A radicals are hydrogen atoms.

This polymer is referred to in this art and herein as an SiH polymer; the SiH groups may be present in the polymer chain backbone and/or at the polymer chain ends. These SiH polymers are well known to the silicone art and are generally commercially available.

They are described, for example, in U.S. Pat. Nos. 3,220,972, 3,436,366, 3,697,473 and 4,340,709.

Such SiH polymers can be represented by the formula:

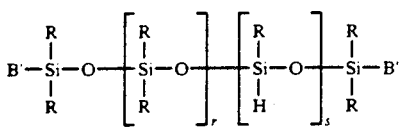

(4)

in which R, r and s are as defined above for formula (1) and the radicals B', which may be identical or different, are each a radical R or a hydrogen atom, and by the formula:

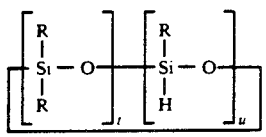

(5)

in which R, t and u are as defined above for formula (2).

A hydrosilylation reaction is then carried out between this SiH polymer of formulae (4) or (5), in the presence of a catalytically effective amount of a platinum catalyst, and an organic benzotriazole compound of the formula:

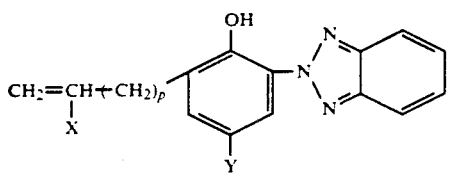

(6)

in which X, Y and p are as defined above.

The compounds of formula (6) and a process for their preparation are described, in particular, in the aforenoted U.S. Pat. Nos. 4,316,033 and 4,373,060.

The recommended process is carried out in two stages. During the first stage, an alkenyl halide of the formula:

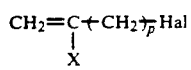

(7)

is reacted with a benzotriazole of the formula:

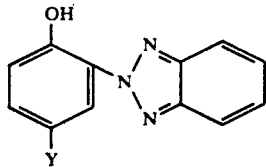

(8)

in which formulae X, Y and p are as defined above and Hal is a halogen, preferably chlorine or bromine.

This first stage is carried out in the presence of a base, for example in the presence of an alkali or alkaline earth metal hydroxide or carbonate, or of an alkali metal amide, alcoholate or hydride, in a solvent compatible with the particular nature of the base, such as water or an organic solvent, for example an alcohol, dioxane, dimethyl sulfoxide or dimethylformamide, at a temperature ranging from ambient to the boiling point of the solvent, to produce a compound of formula:

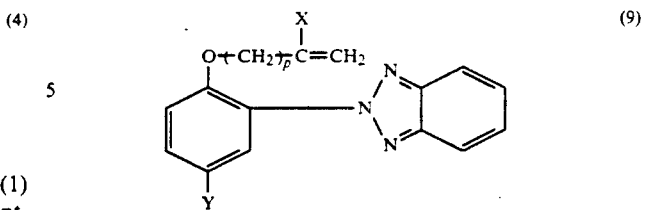

(9)

During a second stage, a Claisen rearrangement is carried out on the compound of formula (9) where X, Y and p are as defined above, to prepare the desired compound of formula (6).

The Claisen rearrangement may be carried out under the conditions described by Tarbell (*Organic Reactions,* vol. 2, page 1, John Wiley, New York (1944)) by heating the compound of formula (9) to at least approximately 170° C., optionally in the presence of a solvent.

The platinum catalysts used to carry out the hydrosilylation reaction between the polymers of formulae (4) or (5) with the organic compound of formula (6) are extensively described in the literature. Representative are, in particular, the complexes of platinum and of an organic product described in U.S. Pat. Nos. 3,159,601, 3,159,602 and 3,220,972, and European Patents EP-A-57,459, EP-A-188,978 and EP-A-190,530 and the complexes of platinum and of vinylated organopolysiloxane which are described in U.S. Pat. Nos. 3,419,593, 3,377,432 and 3,814,730.

To react the SiH polymer of formulae (4) or (5) with the compound of formula (6), an amount of platinum catalyst is typically used, calculated as the weight of platinum metal, ranging from 5 to 600 ppm, preferably from 10 to 200 ppm, based on the weight of SiH polymer of formulae (4) or (5).

The hydrosilylation reaction can be carried out in bulk or in a volatile organic solvent such as toluene, heptane, xylene, tetrahydrofuran and tetrachloroethylene.

It is generally desirable to heat the reaction mixture to a temperature of from 60° to 120° C. for the time required to complete the reaction. Furthermore, the SiH polymer can be added dropwise to the compound of formula (6) in solution in an organic solvent, or else the SiH polymer and the compound of formula (6) can be added simultaneously to a catalyst suspension in the organic solvent.

Whether or not the reaction is complete is monitored by determining the residual SiH groups using alcoholic potassium hydroxide, and the solvent is then removed, for example by distillation under reduced pressure.

The crude oil obtained may be purified, for example, by being cascaded through an absorbent column of silica.

The polymers of formulae (1) and (2) have a remarkably high refractive index. Therefore, they can be used, in particular, mixed with the organic or organosilicon compositions employed for coating optical fibers, to produce a coating having a high index of refraction.

Furthermore, the polymers of formulae (1) or (2) are remarkable lubricants for various plastics, such as polyolefins, polyesters and especially PVC (polyvinyl chloride), and make it possible to prevent these plastics from adhering to processing tools and machines.

For this latter application, from 0.001 to 3 parts by weight of polymer are incorporated per 100 parts by weight of plastic substrate before it is processed.

In order to further illustrate the present invention and the advantages thereof, the following specific examples are given, it being understood that same are intended only as illustrative and in nowise limitative.

EXAMPLE 1

Preparation of the random polymer of the formula:

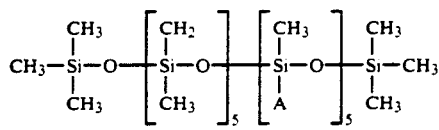

in which A is the radical:

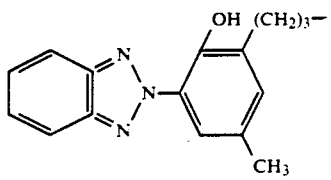

A solution in toluene (40 ml) of 17.1 g of 3-allyl-2-hydroxy-5-methylphenylbenzotriazole and 10.5 g of the random polymer of the above formula, wherein A is a hydrogen atom, was added dropwise over one hour, 30 minutes, to a suspension of platinum on charcoal at a concentration of 5% (70 mg) in dry toluene (5 ml) at 90° to 100° C. under nitrogen and with stirring, while the temperature was maintained from 100° to 105° C.

Stirring and refluxing were continued until the SiH groups had disappeared (absence of a band at 2,180 cm$^{-1}$ in the infrared spectrum), namely 10 hours. The mixture was filtered through paper, the solvent was removed and the residue was washed twice with 80% ethanol. The oil obtained was taken up in chloroform, was dried over sodium sulfate and was filtered through Celite to remove the residues of colloidal platinum. After evaporating off the solvent, an orange-yellow oil was obtained (weight 26 g, yield: 95%).

UV spectrum (CHCl$_3$) :
λ max: 307 nm,
λ max: 345 nm.

Analysis by nuclear magnetic resonance ($^1$H and $^{29}$Si NMR) showed that the product was indeed the polymer of the above formula.

EXAMPLE 2

Into a 100-ml three-necked round-bottom flask maintained at 110° C. by means of an oil bath, fitted with magnetic stirring and a vertical condenser, were charged: 18.8 g (0.071 mole) of 3-allyl-2-hydroxy-5-methylphenylbenzotriazole, 25 ml of toluene and 6 μl of a hexane solution (at a concentration of 8.45% by weight of platinum metal) of a platinum complex prepared from chloroplatinic acid and from 1,3-divinyl-1,1,3,3-tetramethyldisiloxane, as described in U.S. Pat. No. 3,814,730.

10 g of a random SiH polymer of the formula:

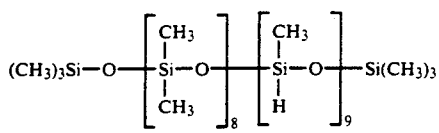

determined by analysis to contain 713 meq/100 g of SiH functional group (meq=milliequivalent), were added over two hours.

At the end of 7 hours of reaction, it was found, by determining the SiH groups by means of butanolic potassium hydroxide, that the degree of conversion of the SiH functional groups was 88%.

A clear, orange-colored oil, with a very high viscosity, was then obtained, after the toluene had been removed by distillation at 110° C. at a reduced pressure of 3.3 kPa.

A proton nuclear magnetic resonance (H NMR) analysis was carried out at 360 MHz in CDCl$_3$ and the chemical shifts, in ppm, relating to the organopolysiloxane moiety were measured.

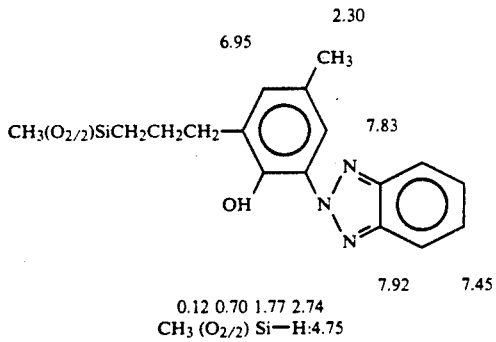

The proportion of the derivatives of 3-allyl-2-hydroxy-5-methylphenylbenzotriazole monomers in the oil produced was 7.6% by weight (determination by GPC: gel permeation chromatography - detection by refractometry).

EXAMPLE 3

The procedures of Example 2 were repeated, except that a molar ratio of 3-allyl-2-hydroxy-5-methylphenylbenzotriazole/SiH equal to 1.3 was employed, namely, 24.5 g of 3-allyl-2-hydroxy-5-methylphenylbenzotriazole per 10 g of SiH polymer.

After 7 hours of reaction, the degree of conversion of the SiH functional groups was 98%. After removal of the toluene at 60° C. at a reduced pressure of 0.6 kPa, 32.5 g of a very viscous, orange-yellow colored oil were obtained, containing 16% by weight of residual monomers.

The removal of these monomers was carried out by cascading the oil through a column of silica gel (Kieselgel support ART 7754, Merck), the solvent for eluting the monomers being a 40/60 volume dichloromethane/heptane mixture, and the solvent for eluting the oil being ethyl acetate. After the removal of ethyl acetate, a translucent orange-colored resin was obtained, containing 65% by weight of benzotriazole-grafted polymer.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A diorganopolysiloxane comprising benzotriazole functional groups and having one of the following formulae (1) or 2):

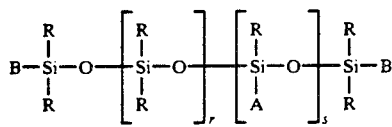

or

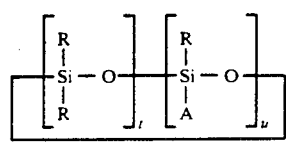

in which the symbols R, which may be identical or different, are each a $C_1$-$C_{10}$ alkyl, phenyl or 3,3,3-trifluoropropyl radical, at least 80% of the number of the radicals R being methyl radicals; the radicals B, which may be identical or different, are each a radical R or a radical A defined below; r is an integer ranging from 0 to 200; s is an integer ranging from 0 to 50, inclusive, with the proviso that, if s is 0, at least one of the two symbols B is A; u is an integer ranging from 1 to 20; t is an integer ranging from 0 to 20; t +u is equal to or greater than 3; and the symbol A is a radical of the formula:

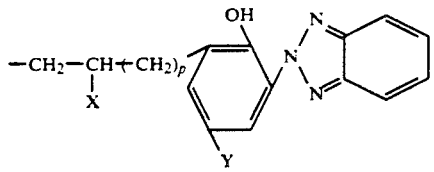

wherein X is a hydrogen atom or a $C_1$-$C_4$ alkyl radical; p is an integer ranging from 1 to 10; and Y is a hydrogen atom or a linear or branched chain $C_1$-$C_8$ alkyl radical.

2. The diorganopolysiloxane as defined by claim 1, wherein R is methyl; B is methyl; Y is methyl; p=1; X is a hydrogen atom or methyl; r ranges from 5 to 20; s ranges from 2 to 15; and t+u ranges from 3 to 10.

3. The diorganopolysiloxane as defined by claim 1, having the formula (1).

4. The diorganopolysiloxane as defined by claim 1, having the formula (2).

5. An optical fiber coated with the diorganopolysiloxane as defined by claim 1.

6. A plastic substrate comprising a lubricating amount of the diorganopolysiloxane as defined by claim 1.

7. A composition of matter comprising polyvinyl chloride and from 0.001 to 3 parts by weight of the diorganopolysiloxane as defined by claim 1.

8. A diorganopolysiloxane comprising benzotriazole functional groups and having one of the following formulae (1) and (2):

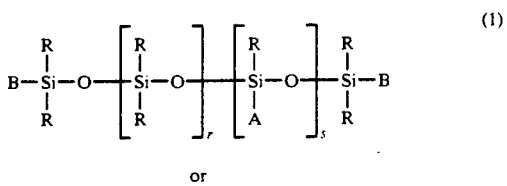

or

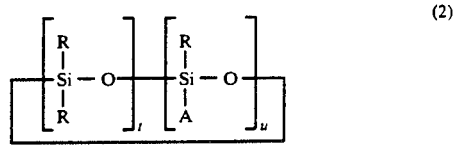

in which the symbols R, which may be identical or different, are each a $C_1$-$C_{10}$ alkyl, phenyl or 3,3,3-trifluoropropyl radical, at least 80% of the number of the radicals R being methyl radicals; the radicals B, which may be identical or different, are each a radical R or a radical A defined below; r is an integer ranging from 0 to 200; s is an integer ranging from 2 to 15, inclusive; u is an integer ranging from 1 to 20; t is an integer ranging from 0 to 20; t+u is equal to or greater than 3; and the symbol A is a radical of the formula:

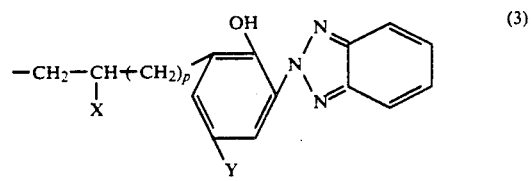

wherein X is a hydrogen atom or a $C_1$-$C_4$ alkyl radical; p is an integer ranging from 1 to 10; and Y is a hydrogen atom or a linear or branched chain $C_1$-$C_8$ alkyl radical.

9. A method for lubricating plastics, comprising adding to a plastic a lubricating amount of a diorganopolysiloxane comprising benzotriazole functional groups and having one of the following formulae (1) or (2):

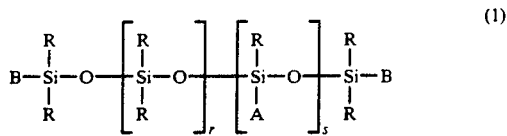

or

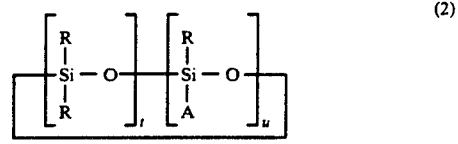

in which the symbols R, which may be identical or different, are each a $C_1$-$C_{10}$ alkyl, phenyl or 3,3,3-trifluoropropyl radical, at least 80% of the number of the radicals R being methyl radicals; the radicals B, which may be identical or different, are each a radical R or a radical A defined below; r is an integer ranging from 0 to 200; s is an integer ranging from 0 to 50, inclusive, with the proviso that, if s is 0, at least one of the two symbols B is A; u is an integer ranging from 1 to 20; t is an integer ranging from 0 to 20; t+u is equal to or greater than 3; and the symbol A is a radical of the formula:

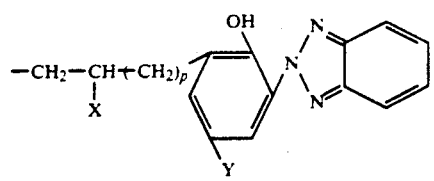

(3)

where X is a hydrogen atom or a $C_1$-$C_4$ alkyl radical; p is an integer ranging from 1 to 10; and Y is a hydrogen atom or a linear or branched chain $C_1$-$C_8$ alkyl radical.

10. The method for lubricating plastics as defined by claim 9, wherein said plastic is selected from the group consisting of polyolefins, polyesters, and polyvinyl chloride.

11. The method for lubricating plastics as defined by claim 9, wherein said lubricating amount of diorganopolysiloxane ranges from 0.001 to 3 parts by weight of the polymer per 100 parts by weight of said plastic.

* * * * *